(12) United States Patent
Song et al.

(10) Patent No.: US 11,145,944 B2
(45) Date of Patent: Oct. 12, 2021

(54) PROTECTION DEVICE AND BATTERY (71) Applicant: NINGDE AMPEREX TECHNOLOGY LIMITED, Ningde (CN)

(72) Inventors: Chuantao Song, Ningde (CN); Zuchao Liu, Ningde (CN); Haiyang Nan, Ningde (CN); Zhiwen Xiao, Ningde (CN); Xinru Su, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 107 days.

(21) Appl. No.: 16/267,028

(22) Filed: Feb. 4, 2019

(65) Prior Publication Data
US 2019/0245192 A1 Aug. 8, 2019

(30) Foreign Application Priority Data

Feb. 5, 2018 (CN) .......................... 201810113803.6

(51) Int. Cl.
*H01M 50/581* (2021.01)
*H01H 71/14* (2006.01)
(Continued)

(52) U.S. Cl.
CPC .......... *H01M 50/581* (2021.01); *H01H 71/08* (2013.01); *H01H 71/14* (2013.01); *H01M 50/531* (2021.01); *H01M 2200/10* (2013.01)

(58) Field of Classification Search
CPC .... H01M 2/348; H01M 2/26; H01M 2200/10; H01M 50/581; H01M 50/531; H01H 71/08; H01H 71/14
(Continued)

(56) References Cited

U.S. PATENT DOCUMENTS 5,766,790 A * 6/1998 Kameishi ........... H01H 37/5436
429/56
5,766,793 A * 6/1998 Kameishi ............ H01M 50/581
429/62
(Continued)

FOREIGN PATENT DOCUMENTS

| CN | 1497634 A | * | 5/2004 |
| CN | 101770896 A | | 7/2010 |
| CN | 103617928 A | * | 3/2014 |

OTHER PUBLICATIONS

Ningde Amperex Technology Ltd., First Office Action for CN201810113803.6, dated Jun. 1, 2020, 19 pgs.

*Primary Examiner* — Milton I Cano
*Assistant Examiner* — Suphia Quraishi
(74) *Attorney, Agent, or Firm* — Morgan, Lewis & Bockius LLP (57) ABSTRACT

The present disclosure relates to a technical field of cells, and discloses a protection device and a battery. The protection device includes: a first connecting member; a second connecting member; a first element; and an elastic sheet. When the elastic sheet has a temperature lower than a first temperature, the elastic sheet is connected to at least one of the first connecting member and the second connecting member; when the temperature of the elastic sheet is equal to the first temperature, the elastic sheet is deformed to allow the first connecting member, the second connecting member, the elastic sheet and the first element to form a series circuit. When the protection device is not triggered, the temperature of the elastic sheet is lower than the first temperature, and the elastic sheet is connected to at least one of the first connecting member and the second connecting member.

20 Claims, 6 Drawing Sheets

(51) Int. Cl.
  *H01H 71/08* (2006.01)
  *H01M 50/531* (2021.01)
(58) Field of Classification Search
  USPC .......................................................... 429/61
  See application file for complete search history.

(56) References Cited

U.S. PATENT DOCUMENTS

| | | | | |
|---|---|---|---|---|
| 6,210,824 B1* | 4/2001 | Sullivan | ............. | H01M 50/581 429/53 |
| 6,515,571 B2* | 2/2003 | Takeda | ............... | H01H 37/5427 337/333 |
| 6,524,739 B1* | 2/2003 | Iwaizono | ............ | H01M 50/572 429/61 |
| 7,075,403 B2* | 7/2006 | Unno | .................... | H01H 71/164 337/365 |
| 8,237,536 B2* | 8/2012 | Takeda | ............... | H01H 37/5418 337/365 |
| 8,289,124 B2* | 10/2012 | Hofsaess | ............ | H01H 37/5427 337/372 |
| 8,906,556 B2* | 12/2014 | Hambitzer | ............ | H01M 4/485 429/231.95 |
| 9,030,787 B2* | 5/2015 | Takeda | ............... | H01H 37/5418 361/26 |
| 9,142,827 B2* | 9/2015 | Cai | ...................... | H01M 50/578 |
| 9,159,985 B2* | 10/2015 | Nakanishi | .............. | H01H 37/14 |
| 9,281,580 B2* | 3/2016 | Yincheng | ................ | H01R 4/34 |
| 9,425,491 B2* | 8/2016 | Hong | .................. | H01M 10/637 |
| 9,653,240 B2* | 5/2017 | Namikawa | ............. | H01H 37/04 |
| 9,698,516 B2* | 7/2017 | Yincheng | ................ | H01R 4/34 |
| 2001/0050609 A1* | 12/2001 | Takeda | ............... | H01H 37/5427 337/333 |
| 2008/0193845 A1* | 8/2008 | Muraoka | ............... | H01M 4/485 429/223 |
| 2008/0241684 A1* | 10/2008 | Muraoka | ........... | H01M 10/0525 429/209 |
| 2010/0028762 A1* | 2/2010 | Yokoyama | .......... | H01M 50/581 429/94 |
| 2010/0098974 A1* | 4/2010 | Kim | ...................... | H01M 50/15 429/7 |
| 2011/0061891 A1* | 3/2011 | Schadler | ................. | C08L 63/00 174/110 SR |
| 2011/0211284 A1* | 9/2011 | Yoneda | .................. | H01H 85/36 361/55 |
| 2012/0009467 A1* | 1/2012 | Park | ...................... | H01M 50/581 429/178 |
| 2012/0299690 A1* | 11/2012 | Nakanishi | ........... | H01M 50/581 337/38 |
| 2013/0089762 A1* | 4/2013 | Hong | .................... | H01M 10/65 429/62 |
| 2014/0272507 A1* | 9/2014 | Ku | ..................... | H01M 10/0431 429/94 |
| 2014/0315058 A1* | 10/2014 | Byun | .................. | H01M 50/578 429/82 |
| 2014/0334055 A1* | 11/2014 | Namikawa | ............. | H01H 37/04 361/115 |
| 2015/0064519 A1* | 3/2015 | Hong | .................. | H01M 10/637 429/62 |
| 2015/0255898 A1* | 9/2015 | Yincheng | ............... | H01R 11/01 439/628 |
| 2015/0318584 A1* | 11/2015 | Yebka | ................. | H01M 10/637 361/679.02 |
| 2016/0035521 A1* | 2/2016 | Namikawa | ......... | H01H 37/5427 337/380 |
| 2016/0149268 A1* | 5/2016 | Fan | ................... | H01M 10/0525 429/50 |
| 2016/0149334 A1* | 5/2016 | Yincheng | ................ | H01R 4/34 439/892 |
| 2016/0372783 A1* | 12/2016 | Min | .................. | H01M 10/0463 |
| 2016/0380307 A1* | 12/2016 | Akita | ................. | H01M 50/446 429/144 |
| 2017/0077775 A1* | 3/2017 | Bodinger | ................ | H02K 3/30 |
| 2017/0288287 A1* | 10/2017 | Martinez | ................. | H01M 4/46 |
| 2019/0245192 A1* | 8/2019 | Song | ....................... | H01H 37/72 |
| 2019/0288352 A1* | 9/2019 | Purkayastha | ........... | H01M 4/13 |
| 2020/0076015 A1* | 3/2020 | Yoon | ....................... | H01M 10/48 |
| 2020/0144009 A1* | 5/2020 | Namikawa | ............. | H01H 37/04 |
| 2020/0144574 A1* | 5/2020 | Bae | ........................ | H01M 50/30 |
| 2020/0234898 A1* | 7/2020 | Namikawa | ........ | H01M 10/4257 |

* cited by examiner

PROTECTION DEVICE AND BATTERY

CROSS-REFERENCE TO RELATED APPLICATIONS

The application claims priority to and benefits of Chinese Patent Application Serial No. 201810113803.6, filed with the State Intellectual Property Office of P. R. China on Feb. 5, 2018, the entire content of which is incorporated herein by reference.

TECHNICAL FIELD

The present application relates to a technical field of batteries, more particularly to a protection device and a battery.

BACKGROUND

In a battery structure of the related art, a main body of a cell and a protection device are generally connected in series, and when the main body of the cell abnormally rises in temperature, the protection device can cut off or greatly reduce a charge and discharge current of the main body of the cell, thereby protecting the cell.

However, a prevalent problem is that there is a long delay in a triggering action (cutting off or greatly reducing the current) of the protection device, cause that even when the temperature of the main body of the cell has risen abnormally, the protection device still does not operate, or the main body of the cell has reached an overcharge state when the protection device operates, that is, the protection device fails to protect the cell.

SUMMARY

The present disclosure discloses a protection device and a battery, so as to improve triggering sensitivity of the protection device.

To attain the above objective, the present disclosure provides the following technical solutions.

A protection device includes: a first connecting member; a second connecting member; a first element; and an elastic sheet. When the elastic sheet has a temperature lower than a first temperature, the elastic sheet is connected to at least one of the first connecting member and the second connecting member; when the temperature of the elastic sheet is higher than or equal to the first temperature, the elastic sheet is deformed to connect to the first connecting member, the second connecting member, and the first element in series.

When the protection device is not triggered, the temperature of the elastic sheet is lower than the first temperature, and the elastic sheet is connected to at least one of the first connecting member and the second connecting member, such that external heat can be quickly conducted to the elastic sheet through the at least one of the first connecting member and the second connecting member. As a result, the elastic sheet can reach the first temperature in time to trigger the protection device timely to cut off or reduce the current, thereby achieving the protection effect. Compared with a scheme in which the elastic sheet is neither directly in contact with the first connecting member nor the second connecting member before being deformed, in the present application, the elastic sheet is connected to at least one of the first connecting member and the second connecting member, and the temperature of the elastic sheet can reach the first temperature in time, so the above protection device has higher triggering sensitivity and better protection effect.

In some embodiments of the present disclosure, the first element has a resistance value not less than 10 ohms.

In some embodiments of the present disclosure, the first element is a positive temperature coefficient thermistor.

In some embodiments of the present disclosure, the first element is located between the first connecting member and the elastic sheet, and the elastic sheet is located between the first element and the second connecting member.

In some embodiments of the present disclosure, when the temperature of the elastic sheet is lower than the first temperature, the elastic sheet is connected to both of the first connecting member and the second connecting member.

In some embodiments of the present disclosure, when the temperature of the elastic sheet is lower than the first temperature, the first connecting member is electrically connected to the second connecting member directly, or the first connecting member is electrically connected to the second connecting member via the elastic sheet.

In some embodiments of the present disclosure, when the temperature of the elastic sheet is lower than the first temperature, one of the first connecting member and the second connecting member is connected to the elastic sheet, and the first connecting member is directly electrically connected to the second connecting member.

In some embodiments of the present disclosure, the protection device further includes a cover plate that covers the first connecting member and the second connecting member.

In some embodiments of the present disclosure, the elastic sheet is connected to at least one of the first connecting member and the second connecting member via a terminal, and the terminal has a silvered surface.

In some embodiments of the present disclosure, the first element includes a top surface, and the top surface is in contact with the elastic sheet and has a curvature same with a curvature of the elastic sheet before deformation.

The battery includes a cell and the protection device according to any one of the above technical solutions. The cell includes a first electrode tab coupled with the first connecting member or the second connecting member.

In some embodiments of the present disclosure, a product of a length of a connection path from the first electrode tab to the elastic sheet and a cooling coefficient of the connection path is less than a difference value between a second temperature of the first electrode tab and the first temperature.

In some embodiments of the present disclosure, the first electrode tab is electrically connected to the first connecting member or the second connecting member directly.

In some embodiments of the present disclosure, the first electrode tab is electrically connected to a transition piece, and the transition piece is electrically connected to the first connecting member or the second connecting member.

In some embodiments of the present disclosure, a welding connection is adopted to a connection path from the first electrode tab to the first connecting member or the second connecting member, and a welding area of each welding zone is not less than 10% of an overlapping area of two welding bodies in the welding zone.

In some embodiments of the present disclosure, the cell includes a first wall, and the protection device is provided to the first wall.

In some embodiments of the present disclosure, the protection device includes a housing, and the housing has an opening facing the first wall.

In some embodiments of the present disclosure, the outside of the first connecting member, the outside of the transition piece, and the outside of the first electrode tab are each enveloped with a porous material layer.

In some embodiments of the present disclosure, the cell further includes a second electrode tab, a polarity of the second electrode tab is opposite to a polarity of the first electrode tab, and the second electrode tab is configured to be connected to an external electrical device.

In some embodiments of the present disclosure, the battery further includes a feed-out piece coupled to the second connecting member or the first connecting member and configured to conduct charging and discharging current of the cell to an external electrical device.

DETAILED DESCRIPTION

Technical solutions in embodiments of the present disclosure will be clearly and completely described with reference to drawings in connection with the embodiments of the present disclosure. Obviously, the embodiments described herein are only part of embodiments of the present disclosure rather than all of the embodiments. All other embodiments obtained by those of ordinary skill in the art based on the embodiments of the present disclosure without creative efforts fall into the scope of the present disclosure.

The present application discloses a battery, and FIGS. 1-4 can be referred to for a structure of the battery.

The present application further discloses a protection device, and FIGS. 5-8 can be referred to for a structure of the protection device.

Specifically, as illustrated in FIGS. 1-4, the battery disclosed in the present application includes a protection device 1 and a cell 2 disclosed in the present application. The cell 2 and the protection device 1 are connected in series. When the cell 2 abnormally rises in temperature, the protection device 1 can cut off or greatly reduce a charge and discharge current of the cell 2, so as to function to protect the battery.

Specifically, the cell 2 includes a first electrode tab 21, and the first electrode tab 21 is coupled with the protection device 1.

Further, the cell 2 also includes a second electrode tab 22, the polarity of the second electrode tab 22 is opposite to the polarity of the first electrode tab 21, and the second electrode tab 22 is connected to an external electrical device. Specifically, the first electrode tab 21, the protection device 1, the external electrical device, and the second electrode tab 22 are connected to form a current path which is a charging and discharging circuit of the cell 2.

In addition, the cell 2 can further include an electrode assembly, an electrolyte, and a packaging casing, in which the electrode assembly and the electrolyte are both provided in the packaging casing. The electrolyte can be an electrolytic solution or a solid electrolyte. The electrode assembly includes a positive electrode, a negative electrode and a separator, and the separator is disposed between the positive electrode and the negative electrode. The electrode assembly may be a wound cell obtained by winding a positive electrode sheet, a negative electrode sheet, and a separator, or may be a laminated cell formed by stacking a positive electrode sheet, a negative electrode sheet, and a separator. The packaging casing may be a packaging bag made of aluminum plastic film, or may be a metal casing. The first electrode tab 21 is provided to one electrode sheet of the electrode assembly, and can be disposed to the positive electrode sheet or to the negative electrode sheet; correspondingly, the second electrode tab 22 is provided to the other electrode sheet of the electrode assembly.

Next, embodiments of the protection device according to the present application will be illustrated by way of example.

As illustrated in FIGS. 5-8, the protection device 1 provided by embodiments of the present application includes a first connecting member 11, a second connecting member 12, a first element 14, and an elastic sheet 13.

The first connecting member 11 and the second connecting member 12 are used for connecting the protection device to a circuit to be protected in series, for example, connecting the protection device to the charging and discharging circuit of the cell in series.

Further, when the elastic sheet 13 has a temperature lower than a first temperature, the elastic sheet 13 is connected to at least one of the first connecting member 11 and the second connecting member 12; when the elastic sheet 13 has a temperature equal to the first temperature, the protection device is triggered, and the elastic sheet 13 is deformed to allow the first element 14 to be connected in series to a circuit in which the first connecting member 11 and the second connecting member 12 are coupled, thereby increasing the resistance in the circuit and reducing the current in the circuit. That is, the elastic sheet 13 is deformed such that the first connecting member 11, the second connecting member 12, the first element 14 and the elastic sheet 13 are connected in series.

When the protection device is not triggered, the temperature of the elastic sheet 13 is lower than the first temperature, and the elastic sheet 13 is connected to at least one of the first connecting member 11 and the second connecting member 12, so that external heat can be quickly conducted to the elastic sheet 13 through the at least one of the first connecting member 11 and the second connecting member 12. As a result, the elastic sheet 13 can reach the first temperature in time, and the elastic sheet 13 is reversed to trigger the protection device in time. After the elastic sheet 13 is reversed, the first connecting member 11 and the second connecting member 12 are electrically connected only by means of the elastic sheet 13 and the first element 14, so that the resistance is increased and the current is decreased in the entire circuit due to the series connection of the first element 14, thereby protecting the battery. Compared with a scheme in which the elastic sheet 3 is neither directly in contact with the first connecting member 11 nor the second connecting member 12 before being deformed, in the present application, the elastic sheet 13 is connected to at least one of the first connecting member 11 and the second connecting member 12, and the temperature of the elastic sheet 13 can reach the first temperature in time, so the above protection device has higher triggering sensitivity and better protection effect.

Based on the above description, the protection device of the present disclosure can include the following specific embodiments.

Embodiment 1

Figure 5:
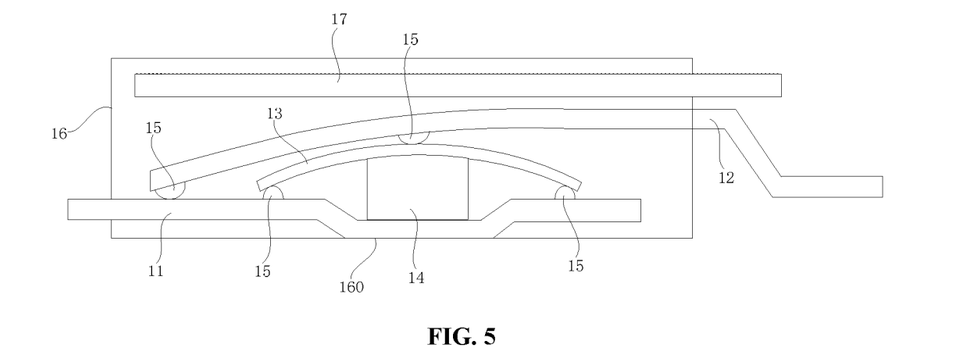
FIG. 5 is a sectional schematic view of a protection device according to an embodiment of the present disclosure.

As illustrated in FIG. 5, when the protection device is not triggered, i.e. the elastic sheet 13 is not deformed, the elastic sheet 13 can be electrically connected to both of the first connecting member 11 and the second connecting member 12, and hence the heat can be conducted to the elastic sheet 13 through both of the first connecting member 11 and the second connecting member 12 to allow the elastic sheet 13 to reach the first temperature more timely, such that the protection device can be triggered in time to cut off or reduce the current, thereby effectively protecting the cell.

Specifically, in the protection device, the elastic sheet 13 is located between the first connecting member 11 and the second connecting member 12; the first element 14 is located between the elastic sheet 13 and the first connecting member 11, and is in contact with the elastic sheet 13 and the first connecting member 11, respectively.

When the protection device is not triggered, i.e., the elastic sheet 13 is not deformed, two ends of the elastic sheet 13 are bent towards a side of the first connecting member 11 and come into contact with the first connecting member 11, and a middle part of the elastic sheet 13 protrudes towards a side of the second connecting member 12 and comes into contact with the second connecting member 12; further, the first connecting member 11 is directly electrically connected to the second connecting member 12, that is, the elastic sheet 13 is not connected to the coupling circuit of the first connecting member 11 and the second connecting member 12.

When the elastic sheet 13 reaches the first temperature, i.e., the protection device is triggered, the two ends of the elastic sheet 13 are bent towards the side of the second connecting member 12 and break contact with the first connecting member 11; at the same time, the two ends of the elastic sheet 13 can bounce the second connecting member 12 to disconnect the second connecting member 12 and the first connecting member 11. In such a case, the first connecting member 11 comes into contact with the first element 14, the first element 14 comes into contact with the elastic sheet 13, and the elastic sheet 13 comes into contact with the second connecting member 12, that is, the first element 14 is connected in series to the coupling circuit of the first connecting member 11 and the second connecting member 12, such that a charging and discharging current of the cell will be reduced or cut off, thereby protecting the cell.

Embodiment 2

Figure 6:
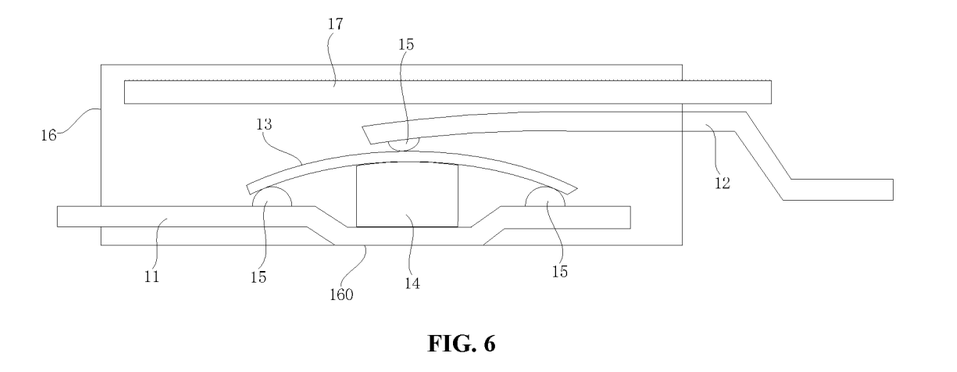
FIG. 6 is a sectional schematic view of a protection device according to another embodiment of the present disclosure.

As illustrated in FIG. 6, the main difference between the protection device of this embodiment and the protection device of the first embodiment lies in that when the protection device of this embodiment is not triggered, i.e., the elastic sheet 13 is not deformed, the first connecting member 11 and the second connecting member 12 are electrically connected by means of the elastic sheet 13, that is, the elastic sheet 13 is connected in series to the coupling circuit of the first connecting member 11 and the second connecting member 12, i.e., the charging and discharging current of the cell will pass through the elastic sheet 13.

Specifically, when the elastic sheet 13 reaches the first temperature, i.e., the protection device is triggered, the two ends of the elastic sheet 13 are bent towards the side of the second connecting member 12 and break contact with the first connecting member 11; at this time, the first element 14 can be connected in series to the coupling circuit of the first connecting member 11 and the second connecting member 12.

Embodiment 3

Figure 7:
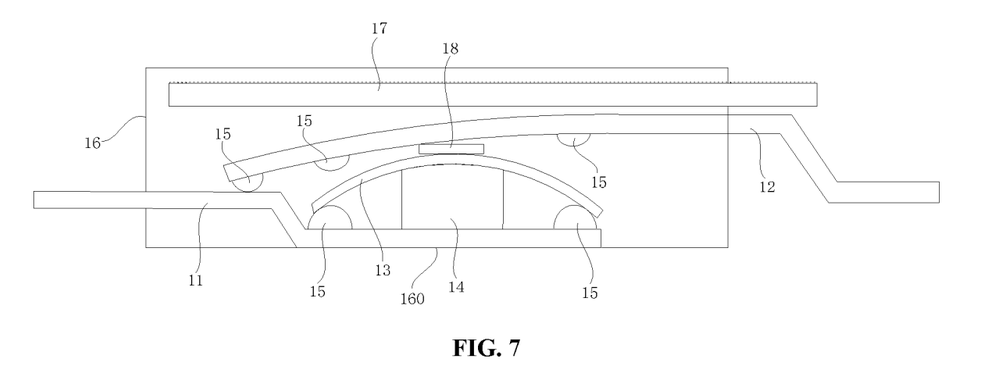
FIG. 7 is a sectional schematic view of a protection device according to yet another embodiment of the present disclosure.

As illustrated in FIG. 7, the main difference between the protection device of this embodiment and the protection device of the first embodiment lies in that when the protection device of this embodiment is not triggered, i.e., the elastic sheet 13 is not deformed, the elastic sheet 13 is connected to the first connecting member 11 but is not connected to the second connecting member 12.

Specifically, when the protection device is not triggered, i.e., the elastic sheet 13 is not deformed, the two ends of the elastic sheet 13 are bent towards the side of the first connecting member 11 and come into contact with the first connecting member 11, and the middle part of the elastic sheet 13 protrudes towards the side of the second connecting member 12 but is not in contact with the second connecting member 12.

In some embodiments of the present disclosure, the protection device in this embodiment can further be provided with a partition plate 18, and the partition plate 18 is electrically insulated and located between the middle part of the elastic sheet 13 and the second connecting member 12, to ensure that the middle part of the elastic sheet 13 and the second connecting member 12 cannot be electrically connected.

Embodiment 4

Figure 8:
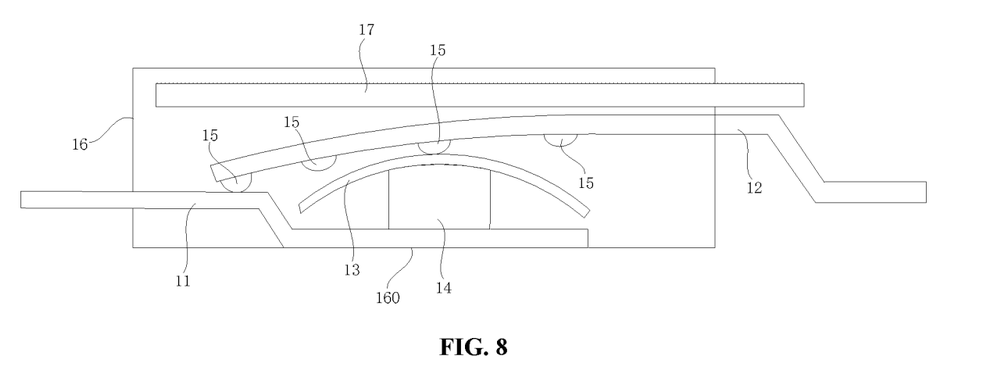
FIG. 8 is a sectional schematic view of a protection device according to still another embodiment of the present disclosure.

As illustrated in FIG. 8, the main difference between the protection device of this embodiment and the protection device of the first embodiment lies in that when the protection device of this embodiment is not triggered, i.e., the elastic sheet 13 is not deformed, the elastic sheet 13 is connected to the second connecting member 12 but is not connected to the first connecting member 11.

Specifically, when the protection device is not triggered, i.e., the elastic sheet 13 is not deformed, the two ends of the elastic sheet 13 are bent towards the side of the first connecting member 11 but are not in contact with the first connecting member 11, and the middle part of the elastic sheet 13 protrudes towards the side of the second connecting member 12 and is electrically connected to the second connecting member 12.

When the elastic sheet 13 reaches the first temperature, the two ends of the elastic sheet 13 are bent towards the side of the second connecting member 12, and bounce the second connecting member 12 to disconnect the second connecting member 12 and the first connecting member 11. At this time, the first element 14 can be connected in series to the coupling circuit of the first connecting member 11 and the second connecting member 12.

Figure 9:
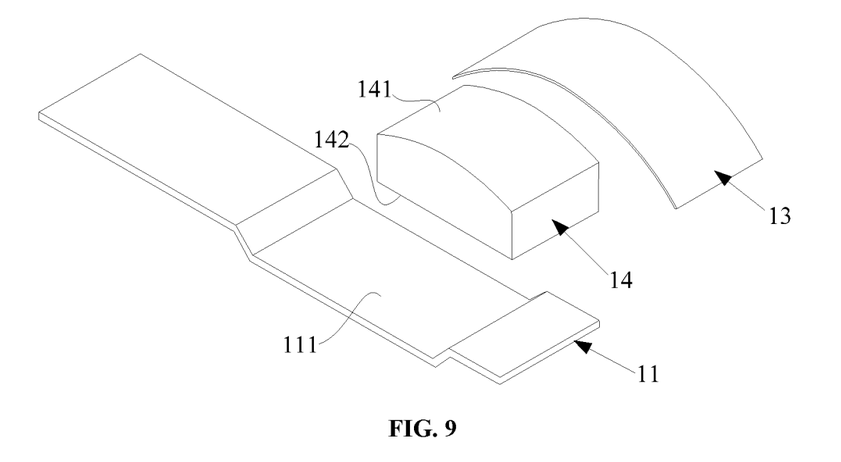
FIG. 9 is an exploded schematic view of a first connecting member, an elastic sheet, and a first element in a protection device according to an embodiment of the present disclosure.

Based on the embodiments 1-4, as illustrated in FIG. 9, the first element 14 can include a top surface 141 oriented towards the elastic sheet 13. Specifically, when the protection device is not triggered, i.e., before the elastic sheet 13 is deformed, the top surface 141 of the first element 14 is in surface contact with the elastic sheet 13.

In some embodiments of the present disclosure, the curvature of the top surface 141 of the first element 14 matches the curvature of the elastic sheet 13 before deformation, and hence, a contact area between the first element 14 and the elastic sheet 13 before deformation is relatively large, and the heat conduction efficiency is relatively high. Therefore, the heat can be quickly conducted to the elastic sheet 13 through the first connecting member 11 and the first element 14 in order to enable the protection device to be triggered, so as to reduce or cut off the current in time, thereby protecting the cell.

Based on the embodiments 1-4, as illustrated in FIG. 9, the first element 14 includes a bottom surface 142 oriented towards the first connecting member 11. Specifically, the bottom surface 142 of the first element 14 is in surface contact with the first connecting member 11.

In some embodiments of the present disclosure, the bottom surface 142 of the first element 14 and a side surface 111 of the first connecting member 11 facing the first element 14 are both plane surfaces.

In a specific embodiment, the first element 14 can employ a variety of elements in different forms as long as the purpose of reducing or cutting off the current can be achieved.

Embodiment A

The first element 14 can be an electronic element with a fixed resistance value, such as a fixed resistor. Further, the resistance value of the first element 14 is not less than 10 ohms.

Specifically, when the protection device is not triggered, the first connecting member 11 and the second connecting member 12 are directly electrically connected or electrically connected through the elastic sheet 13, so that the first element 14 is not connected to the coupling circuit of the first connecting member 11 and the second connecting member 12, i.e., the first element 14 is not connected to the charging and discharging circuit of the cell 2. When the protection device is triggered, the first element 14 is connected into the charging and discharging circuit of the cell 2, so that the resistance in the charging and discharging circuit is greatly increased, and the charging and discharging current is greatly reduced, even close to zero, thereby protecting the cell.

Embodiment B

The first element 14 can be a positive temperature coefficient (PTC) thermistor. The PTC thermistor is a typical temperature-sensitive semiconductor resistor—when a certain temperature (Curie temperature) is exceeded, its resistance value increases stepwise with rising temperature. For example, a ceramic PTC thermistor has a small resistance value below the Curie temperature, and the resistance value increases stepwise by 1000 times to a million times above the Curie temperature.

Specifically, when the protection device is not triggered, the PTC thermistor is not connected to the charging and discharging circuit of the cell 2; after the protection device is triggered, the PTC thermistor is connected to the charging and discharging circuit of the cell 2 and its resistance value increases significantly along with the rising temperature, such that the resistance value in the charging and discharging circuit increases significantly, and the charging and discharging current is greatly reduced, even close to zero, thereby protecting the cell.

Embodiment C

The first element 14 can also be a current fuse; further, when the protection device is triggered, the current fuse can be connected to the charging and discharging circuit of the cell 2, and when a certain temperature is exceeded, the current fuse is blown, so that the charging and discharging current can be cut off to protect the cell.

As illustrated in FIGS. 5-8, in a specific embodiment, the electrical connection between any two of the first connecting member 11, the second connecting member 12 and the elastic sheet 13 can be realized by a terminal 15, and the terminal 15 can improve reliability of the electrical connection.

For example, the connection between the first connecting member 11 and the second connecting member 12 can be realized by the terminal 15. Specifically, the terminal 15 can be provided to the second connecting member 12, and the first connecting member 11 can be in contact with the terminal 15 to achieve the electrical connection with the second connecting member 12. Certainly, the terminal 15 can be provided to the first connecting member 11, such that the second connecting member 12 can be in contact with the terminal 15 to achieve the electrical connection with the first connecting member 11.

Likewise, the connection between the elastic sheet 13 and the first connecting member 11 can also be realized by the terminal 15; the connection between the elastic sheet 13 and the second connecting member 12 can be realized by the terminal 15 as well.

In some embodiments of the present disclosure, a surface of the above terminal 15 can be silvered to enhance an effect of heat conduction between two connecting bodies, such that the heat can be conducted to the elastic sheet 13 more timely to trigger the protection device to reduce or cut off the charging and discharging current of the cell, thereby protecting the battery. Specifically, the connecting bodies are two structures electrically connected through the terminal 15.

Further, a contact surface of the terminal 15 can match a surface of the connecting body in contact with the terminal 15 to enlarge a contact area and enhance the heat conduction effect, such that the heat can be conducted to the elastic sheet 13 more timely to trigger the protection device to reduce or cut off the current, thereby protecting the battery. For example, if the surface of the connecting body (the first connecting member 11 or the second connecting member 12) in contact with the terminal 15 is a plane surface, the contact surface of the terminal 15 is designed to be a plane surface; if the surface of the connecting body (e.g. the elastic sheet 13) in contact with the terminal 15 is an arc surface, the contact surface of the terminal 15 is designed to be an arc surface with the same radian.

As illustrated in FIGS. 5-8, the protection device further includes a housing 16 to protect a protection circuit in the housing 16, and the protection circuit is a coupling circuit of the first connecting member 11 and the second connecting member 12.

As illustrated in FIGS. 5-8, the protection device can further include a cover plate 17. The cover plate 17 is disposed in the housing 16 and covers the first connecting member 11 and the second connecting member 12 from the above. The cover plate 17 has good supporting effect, and is resistant to external pressure to protect the coupling circuit between the first connecting member 11 and the second connecting member 12.

Next, specific embodiments of the battery according to the present application will be illustrated by way of example.

As illustrated in FIGS. 1-4, in the battery of the present application, the cell 2 is connected to the protection device 1 in series via the first electrode tab 21. Specifically, the first electrode tab 21 can be coupled with the first connecting member 11 of the protection device 1; certainly, the first electrode tab 21 can also be coupled with the second connecting member 12 of the protection device 1.

In a specific embodiment, a product of a length of a connection path from the first electrode tab 21 to the elastic sheet 13 and a cooling coefficient of this path is less than a difference value between a second temperature and a first temperature.

The second temperature is a temperature of the first electrode tab 21 when the cell 2 is overcharged, and the first temperature is a temperature at which the elastic sheet 13 is deformed, i.e., a triggering temperature of the protection device 1.

Specifically, supposing that $T_2$ is the second temperature, $T_1$ is the first temperature, L is the length of the connection path from the first electrode tab 21 to the elastic sheet 13, and $\alpha$ is the cooling coefficient of the connection path, the above cell satisfies the following formula: $L \cdot \alpha < (T_2 - T_1)$, i.e., $T_1 + L \cdot \alpha < T_2$, in which $T_2$ is the temperature of the first electrode tab 21 when the cell 2 is overcharged, which means the temperature of the cell 2 rises to a critical state in which a combustion or explosion reaction occurs; $T_1$ is the temperature of the elastic sheet 13 when the protection device 1 is triggered; and $T_1 + L \cdot \alpha$ is the temperature of the first electrode tab 21 when the protection device 1 is triggered. Hence, the formula $T_1 + L \cdot \alpha < T_2$ means that the cell satisfies: the temperature of the first electrode tab 21 when the protection device 1 is triggered is lower than the temperature of the first electrode tab 21 when the cell 2 is overcharged, that is, the protection device 1 has been triggered before the cell 2 reaches an overcharged state. In summary, in the above-mentioned cell, the triggering action of the protection device 1 is relatively timely, which can prevent the cell 2 from being overcharged, such that the protection device 1 in the above cell can protect the cell 2 timely and effectively.

As illustrated in FIGS. 1-4, specific embodiments of the battery in the present application will be elaborated below by way of an example where the first electrode tab 21 and the first connecting member 11 are coupled.

Specifically, the first electrode tab 21 can be coupled with the first connecting member 11 in the following ways.

Figure 1:
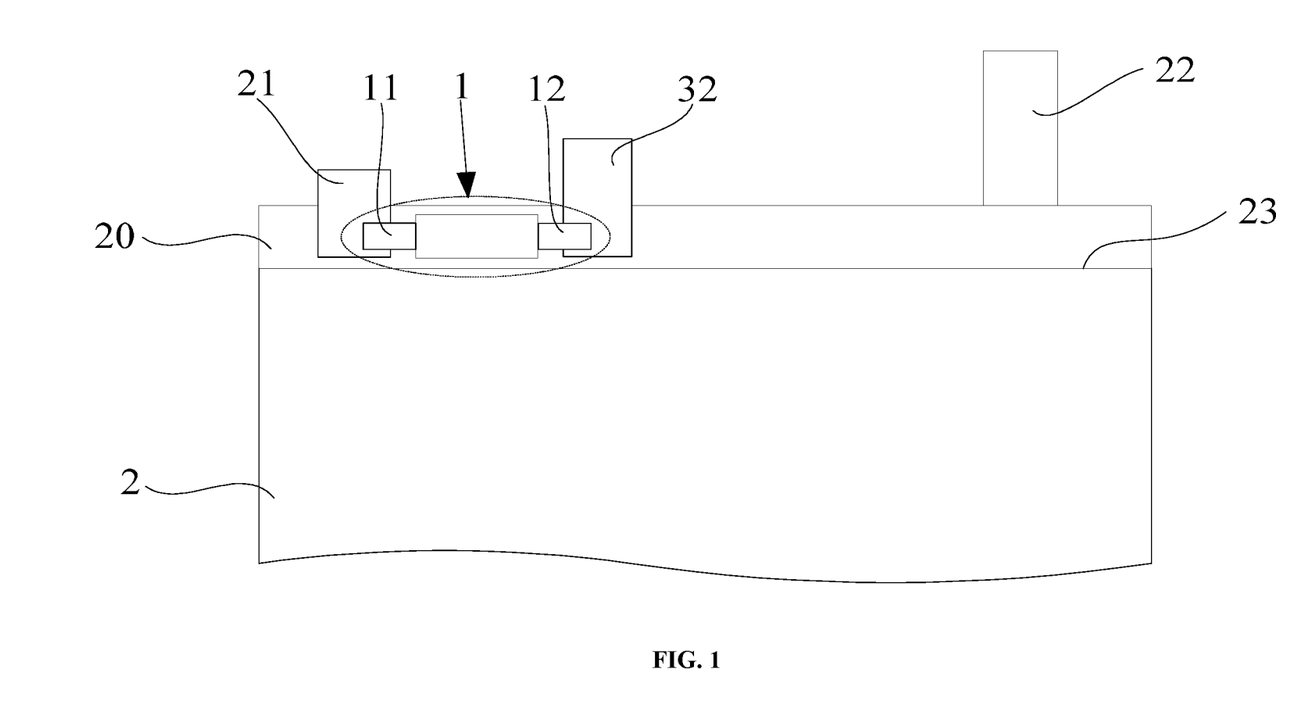
FIG. 1 is a partial schematic view of a battery according to an embodiment of the present disclosure.
Figure 4:
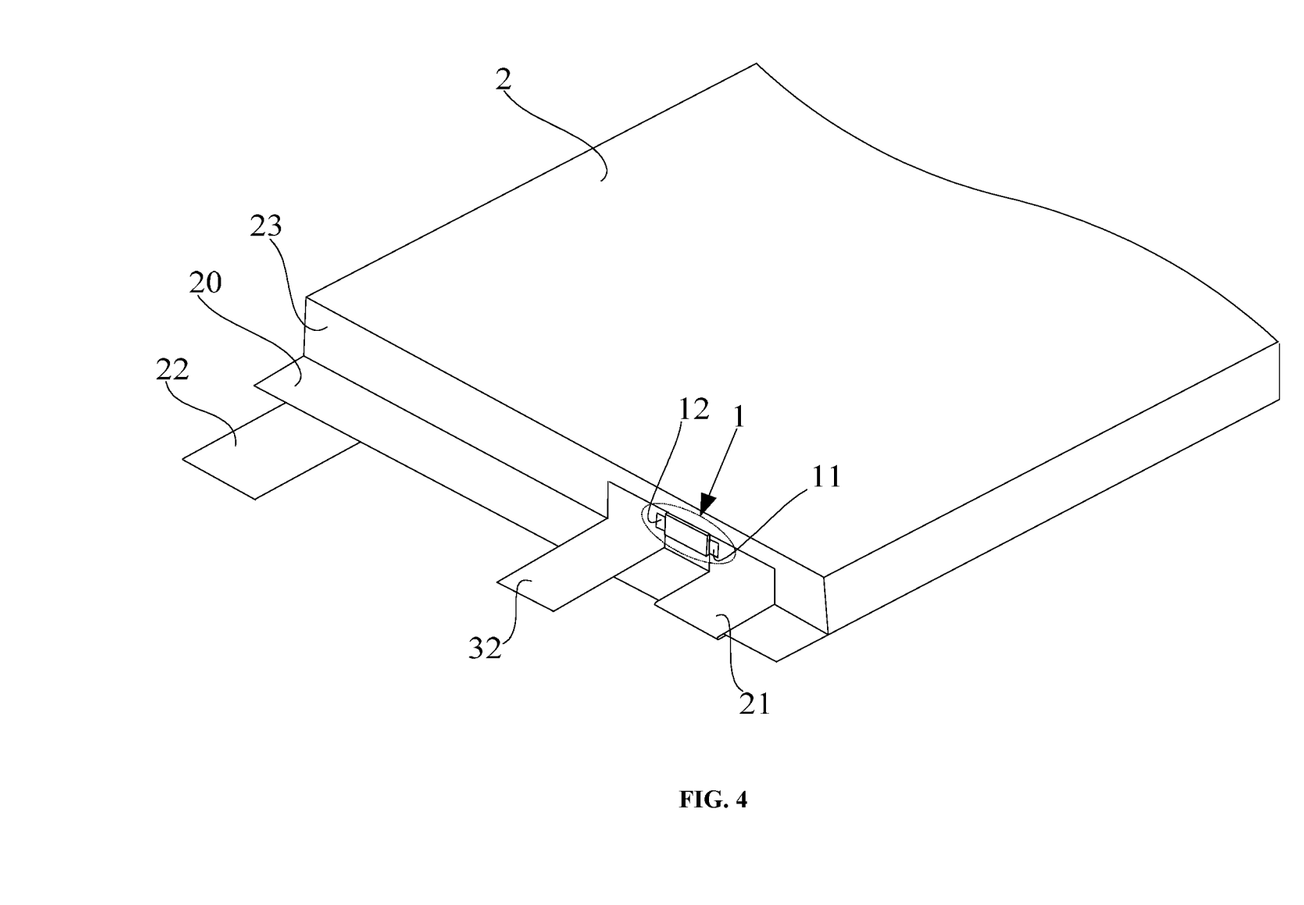
FIG. 4 is a partial schematic view of a battery according to still another embodiment of the present disclosure.

First way: as illustrated in FIGS. 1 and 4, the first connecting member 11 and the first electrode tab 21 are directly electrically connected, that is, the heat of the cell 2 is directly conducted to the elastic sheet 13 through the first connecting member 11. Specifically, as illustrated in FIG. 1, the first electrode tab 21 protrudes from a first edge 20, and is folded towards the first edge 20, bonded to the first edge 20, and directly electrically connected to the first connecting member 11 on the first edge 20. Alternatively, as illustrated in FIG. 4, the first electrode tab 21 protrudes from the first edge 20, and is folded towards a first wall 23, bonded to the first wall 23, and directly electrically connected to the first connecting member 11 on the first wall 23.

Figure 2:
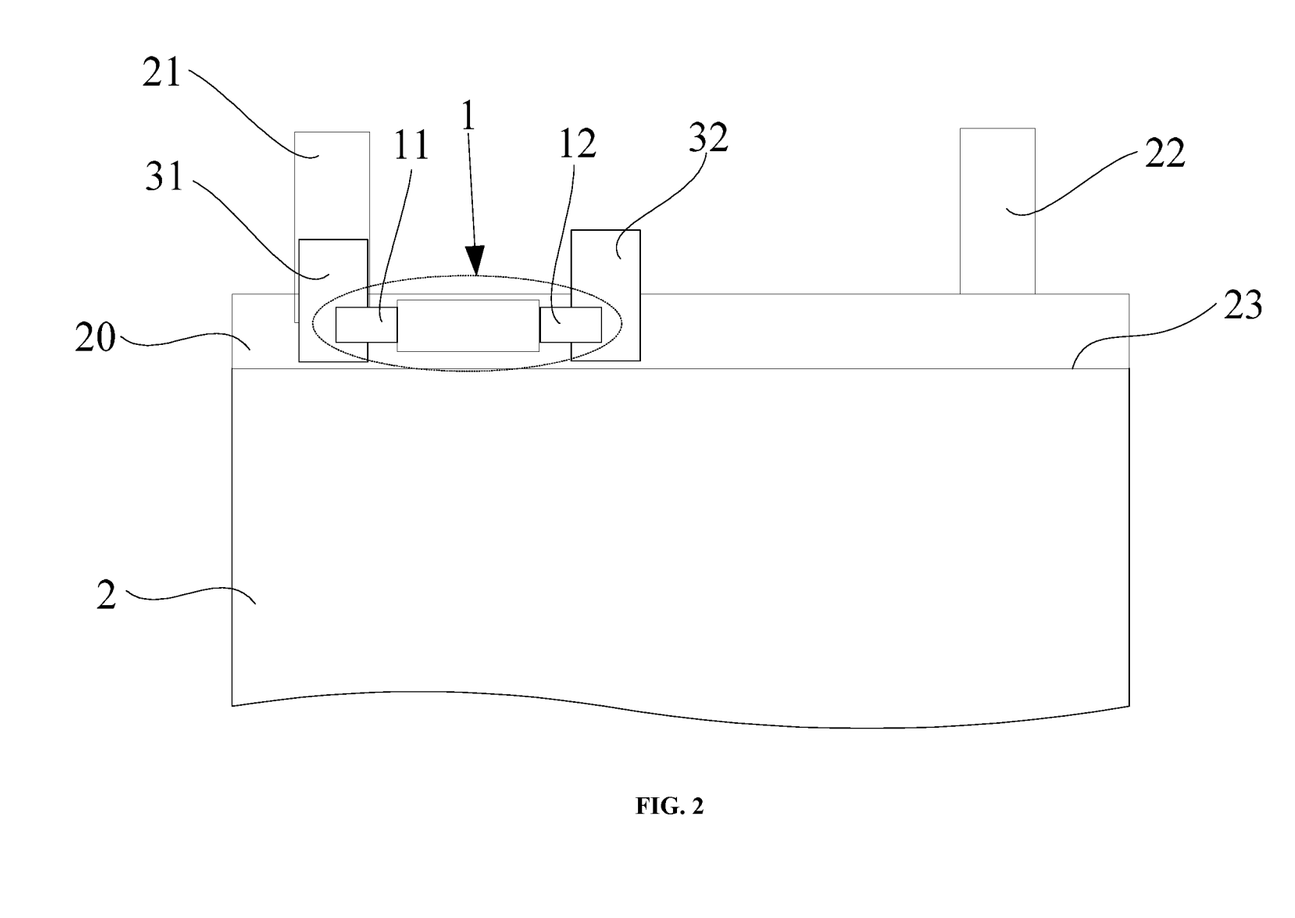
FIG. 2 is a partial schematic view of a battery according to another embodiment of the present disclosure.
Figure 3:
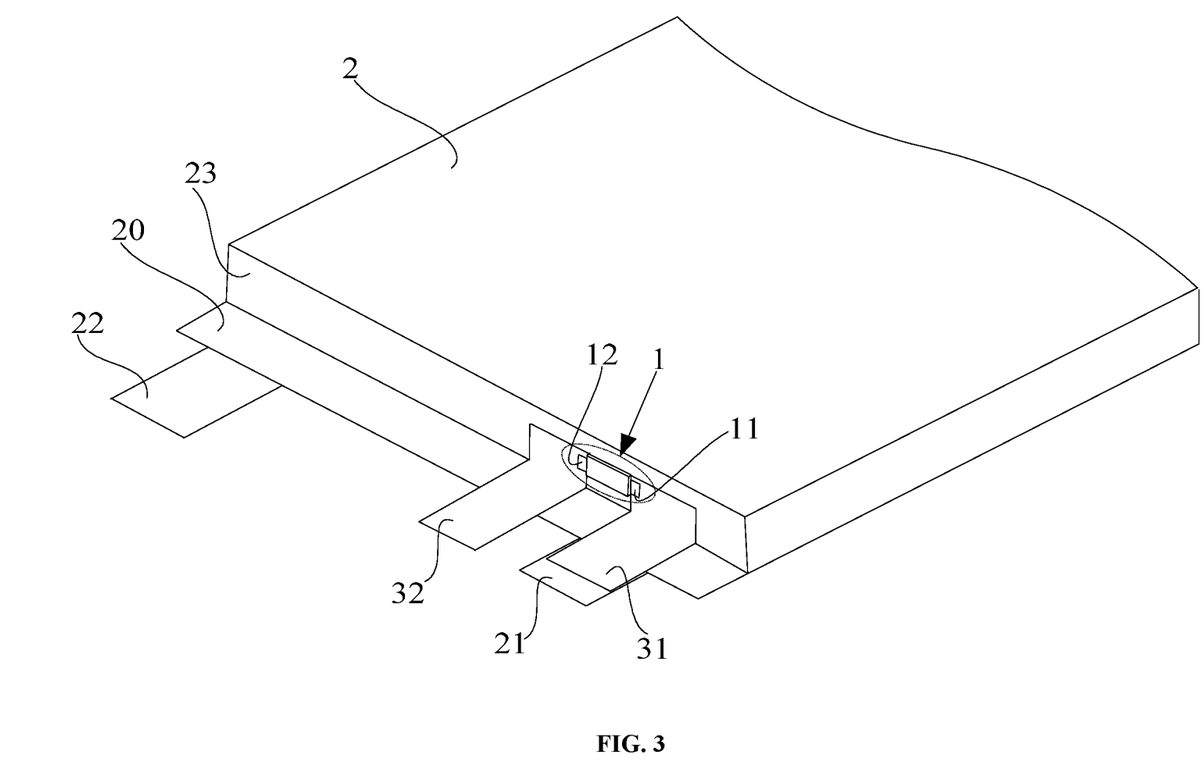
FIG. 3 is a partial schematic view of a battery according to yet another embodiment of the present disclosure.

Second way: as illustrated in FIGS. 2 and 3, the battery can further include a transition piece 31, the first connecting member 11 and the transition piece 31 are electrically connected, and the transition piece 31 and the first electrode tab 21 are electrically connected. That is, the transition piece 31 is connected between the first connecting member 11 and the first electrode tab 21.

Further, the battery can further include a feed-out piece 32, and the feed-out piece 32 is coupled to the second connecting member 12 of the protection device 1 and used for conducting the charging and discharging current of the cell 2 to the external electrical device.

As illustrated in FIGS. 1-4, in a specific embodiment, the connection between the first connecting member 11 to the first electrode tab 21 is performed by welding, such as laser welding or electric resistance welding; further, a welding area of each welding zone is not less than 10% of an overlapping area of two welding bodies in the welding zone. Thus, it is possible to greatly improve the efficiency of heat conduction from the connection path between the first electrode tab 21 and the first connecting member 11 to the elastic sheet 13, and hence facilitate the improvement of the triggering sensitivity of the protection device 1.

Specifically, for example, as illustrated in FIG. 2, when the first connecting member 11 is connected to the first electrode tab 21 through the transition piece 31, there are two welding zones in the connection path from the first connecting member 11 to the first electrode tab 21, namely, a welding zone between the first connecting member 11 and the transition piece 31, and a welding zone between the transition piece 31 and the first electrode tab 21. In such a case, in the two welding zones, the number of welding spots in each welding zone may be greater than four, as long as the welding area in each welding zone can account for 10% or more of the overlapping area of the two welding bodies.

In a specific embodiment, the transition piece 31 and the first connecting member 11 can be made of copper (Cu) materials. The thermal conductivity of Cu is high, and specifically, the thermal conductivity of Cu can reach 377 W/mK at 100° C., which can greatly improve the efficiency of heat conduction from the transition piece 31 and the first connecting member 11 to the elastic sheet 13, and facilitate the improvement of the triggering sensitivity of the protection device 1.

In another specific embodiment, surfaces of the first connecting member 11 and the transition piece 31 can be coated with a material having better thermal conductivity, such as diamond, graphite or silicon material, to allow heat to be conducted to the elastic sheet 13 more efficiently. Alternatively, the outside of the first connecting member 11, the outside of the transition piece 31, and the outside of the first electrode tab 21 are each enveloped with a porous material layer; that is, a heat conducting path from the cell 2 to the elastic sheet 13 is externally enveloped with a porous material layer. The porous material has good thermal insulation performance, and when it is used for enveloping the heat conducting path from the cell 2 to the elastic sheet 13, heat loss on the heat conducting path can be reduced effectively to facilitate the more efficient heat conduction to the elastic sheet 13 and improve the triggering sensitivity of the protection device 1.

It should be noted that when the first electrode tab 21 is coupled with the second connecting member 12, the first connecting members 11 in the above embodiments should all be replaced with the second connecting members 12.

As illustrated in FIGS. 3 and 4, in a specific embodiment, the cell 2 includes a first wall 23, and the protection device 1 is provided to the first wall 23. In some embodiments of the present disclosure, the protection device 1 is bonded to the first wall 23. The first wall 23 is close to the internal structure of the cell 2. Thus, by providing the protection device 1 to the first wall 23, the heat in the cell 2 can be quickly conducted into the protection device 1 through the first wall 23, and hence the protection device 1 can be triggered more timely to cut off or reduce the current, so as to protect the battery.

Further, the cell 2 also includes a first edge 20, and specifically, the first edge 20 can be a sealing edge formed by sealing with a packaging film, and the first electrode tab 21 protrudes from the first edge 20; In some embodiments of the present disclosure, the first edge 20 and the first wall 23 are both located at the top of the cell 2, and are adjacent to each other. Certainly, as illustrated in FIGS. 1 and 2, in specific implementation, the protection device 1 can also be provided to the first edge 20.

In a specific embodiment, a side of the housing 16 of the protection device 1 adjacent to the cell 2 is provided with an opening to expose the protection circuit in the protection device 1. For example, if the protection device 1 is provided to the first wall 23, a side of the protection device 1 facing the first wall 23 is provided with an opening, and hence the heat of the cell 2 can be directly conducted to the protection circuit through the first wall 23 to cause the elastic sheet 13 in the protection circuit to be deformed, such that the protection device 1 is triggered timely to reduce or cut off the charging and discharging current, thereby protecting the cell effectively.

Specifically, as illustrated in FIGS. 5-8, an opening 160 of the housing 16 can expose the first connecting member 11 of the protection device, such that when the protection device 1 is provided to the first wall 23, the first connecting member 11 can be in direct contact with the first wall 23, and the heat of the first wall 23 can be directly conducted to the elastic sheet 13 through the first connecting member 11.

Obviously, those skilled in the art can make various modifications and variations to the embodiments of the present disclosure without departing from the spirit and scope of the present disclosure. Thus, the present disclosure is intended to include these modifications and variations if these modifications and variations of the present disclosure fall into the scope of the claims or the like.

What is claimed is:

1. A protection device, comprising:
   a first connecting member;
   a second connecting member;
   a first element; and
   an elastic sheet,
   wherein the elastic sheet is connected to at least one of the first connecting member and the second connecting member when the elastic sheet has a temperature lower than a first temperature, and the elastic sheet is deformed when the temperature of the elastic sheet is higher than or equal to the first temperature, to connect to the first connecting member, the second connecting member, and the first element in series, wherein the first element comprises a curved top surface, the curved top surface is in contact with the elastic sheet, and the curved top surface of the first element has a curvature that matches a curvature of the elastic sheet before deformation.

2. The protection device according to claim 1, wherein the first element has a resistance value not less than 10 ohms.

3. The protection device according to claim 1, wherein the first element is a positive temperature coefficient thermistor.

4. The protection device according to claim 1, wherein the first element is located between the first connecting member and the elastic sheet, and the elastic sheet is located between the first element and the second connecting member.

5. The protection device according to claim 1, wherein when the temperature of the elastic sheet is lower than the first temperature, the elastic sheet is connected to both of the first connecting member and the second connecting member.

6. The protection device according to claim 5, wherein when the temperature of the elastic sheet is lower than the first temperature, the first connecting member is electrically connected to the second connecting member directly, or the first connecting member is electrically connected to the second connecting member via the elastic sheet.

7. The protection device according to claim 1, wherein when the temperature of the elastic sheet is lower than the first temperature, the first connecting member is electrically connected to the second connecting member directly.

8. The protection device according to claim 1, further comprising a cover plate, wherein the cover plate covers the first connecting member and the second connecting member.

9. The protection device according to claim 1, wherein the elastic sheet is connected to the first connecting member and the second connecting member via a terminal, and the terminal has a silvered surface.

10. The protection device according to claim 1, wherein the first element has a curvature same with a curvature of the elastic sheet before deformation.

11. A battery, comprising a cell and a protection device, the protection device comprising:
    a first connecting member;
    a second connecting member;
    a first element; and
    an elastic sheet,
    wherein the elastic sheet is connected to at least one of the first connecting member and the second connecting member when the elastic sheet has a temperature lower than a first temperature, and the elastic sheet is deformed when the temperature of the elastic sheet is higher than or equal to the first temperature, to connect to the first connecting member, the second connecting member, and the first element in series;
    wherein the cell comprises a first electrode tab coupled with the first connecting member or the second connecting member, the first element comprises a top surface, the top surface is in contact with the elastic sheet, and the curved top surface of the first element has a curvature that matches a curvature of the elastic sheet before deformation.

12. The battery according to claim 11, wherein the product of a length of a connection path from the first electrode tab to the elastic sheet and a cooling coefficient of the connection path is less than a difference value between a second temperature of the first electrode tab and the first temperature.

13. The battery according to claim 12, wherein the first electrode tab is electrically connected to the first connecting member or the second connecting member directly.

14. The battery according to claim 12, further comprising a transition piece, wherein the first electrode tab is electrically connected to the transition piece, and the transition piece is electrically connected to the first connecting member or the second connecting member.

15. The battery according to claim 11, wherein a welding connection is adopted to a path from the first electrode tab to the first connecting member or the second connecting member, and a welding area of each welding zone is not less than 10% of an overlapping area of two welding bodies in the welding zone.

16. The battery according to claim 11, wherein the cell comprises a first wall, and the protection device is provided to the first wall.

17. The battery according to claim 16, wherein the protection device comprises a housing, and the housing has an opening facing the first wall.

18. The battery according to claim 11, wherein an outside of the first connecting member, a outside of the transition piece, and a outside of the first electrode tab are each enveloped with a porous material layer.

19. The battery according to claim 11, wherein the cell further comprises a second electrode tab, a polarity of the second electrode tab is opposite to a polarity of the first electrode tab, and the second electrode tab is configured to be connected to an external electrical device.

20. The battery according to claim 11, further comprising a feed-out piece, wherein the feed-out piece is coupled to the second connecting member or the first connecting member and configured to conduct charging and discharging current of the cell to an external electrical device.

* * * * *